(12) United States Patent
Herz et al.

(10) Patent No.: US 9,001,016 B2
(45) Date of Patent: Apr. 7, 2015

(54) HARDWARE DRIVEN DISPLAY RESTORE MECHANISM

(75) Inventors: William S. Herz, Hayward, CA (US); Gang Han, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 1200 days.

(21) Appl. No.: 11/903,160

(22) Filed: Sep. 19, 2007

(65) Prior Publication Data
US 2009/0073102 A1    Mar. 19, 2009

(51) Int. Cl.
G09G 3/36      (2006.01)
G06F 3/14      (2006.01)

(52) U.S. Cl.
CPC .............. *G06F 3/14* (2013.01); *G09G 2320/08* (2013.01); *G09G 2340/0442* (2013.01); *G09G 2330/026* (2013.01); *G09G 2320/0606* (2013.01); *G09G 2340/0407* (2013.01)

(58) Field of Classification Search
USPC .................................................. 345/98–100
See application file for complete search history.

(56) References Cited

U.S. PATENT DOCUMENTS

| | | | | |
|---|---|---|---|---|
| 4,926,166 A * | 5/1990 | Fujisawa et al. | | 345/3.1 |
| 5,448,260 A * | 9/1995 | Zenda et al. | | 345/100 |
| 5,606,348 A * | 2/1997 | Chiu | | 345/213 |
| 5,699,076 A * | 12/1997 | Tomiyasu | | 345/103 |
| 5,740,352 A * | 4/1998 | Philipp et al. | | 714/40 |
| 6,104,359 A * | 8/2000 | Endres et al. | | 345/589 |
| 6,421,042 B1 * | 7/2002 | Omura et al. | | 345/157 |
| 6,614,422 B1 * | 9/2003 | Rafii et al. | | 345/168 |
| 6,639,613 B1 | 10/2003 | Nason et al. | | |
| 6,832,237 B1 | 12/2004 | Christensen et al. | | |
| 7,091,984 B1 * | 8/2006 | Clark | | 345/587 |
| 7,139,850 B2 * | 11/2006 | Amemiya et al. | | 710/48 |
| 2002/0149541 A1 * | 10/2002 | Shin | | 345/3.1 |
| 2003/0098819 A1 * | 5/2003 | Sukthankar et al. | | 345/1.1 |
| 2004/0013434 A1 * | 1/2004 | Hua | | 398/106 |
| 2004/0035316 A1 * | 2/2004 | Chebiam et al. | | 106/1.22 |
| 2004/0095292 A1 * | 5/2004 | Ogura | | 345/1.1 |
| 2004/0130526 A1 | 7/2004 | Rosenberg | | |
| 2004/0252075 A1 * | 12/2004 | Matsubara | | 345/1.1 |
| 2004/0257332 A1 * | 12/2004 | Turgeman | | 345/156 |
| 2006/0136764 A1 * | 6/2006 | Munguia | | 713/322 |
| 2006/0139345 A1 * | 6/2006 | Tseng et al. | | 345/213 |
| 2007/0067498 A1 * | 3/2007 | Lippert et al. | | 710/1 |
| 2009/0073101 A1 * | 3/2009 | Herz et al. | | 345/98 |

* cited by examiner

*Primary Examiner* — Waseem Moorad

(57) ABSTRACT

A method and system for restoring output to a display device. The method includes receiving a request to restore the output, modifying output timing so output is visible on a display device, and invoking an output configuration application. The method and system allow a user to restore the output on a display device after the output has been configured to settings which exceed the capabilities of the display device.

24 Claims, 8 Drawing Sheets

HARDWARE DRIVEN DISPLAY RESTORE MECHANISM

CROSS REFERENCE TO RELATED APPLICATION

This application is related to commonly assigned U.S. patent application Ser. No. 11/903,156, entitled "SOFTWARE DRIVEN DISPLAY RESTORE MECHANISM" by Herz et al., which is incorporated herein in its entirety.

FIELD OF THE INVENTION

The present invention is generally related to hardware graphics systems.

BACKGROUND OF THE INVENTION

Increasing distribution of digital content has helped the growth of more advanced display technologies such as high definition televisions. At the same time computers have developed an increasing role in entertainment systems and thus connected with high definition devices such as televisions. In order to get the best possible visual experience, the output settings need to match content format and the capabilities of the display device. Therefore, there are times when a user will need to change the resolution of the output or when a new device is connected.

A problem exists however when the user sets output settings (e.g., resolution or refresh rate) beyond the capabilities of a display device. For example, the user may be trying to watch a high definition DVD and sets the display resolution to a "1080p" while the display device (e.g., plasma television) only supports a display resolution up to 720p. Such changes to the display resolution are typically implemented via a television handheld remote control that manipulates one or more on-screen menus (e.g., a menu of options graphically presented on the television screen). Upon pressing the remote control button to select the high-resolution, the user will then be presented with either a blank screen or a corrupted and incomprehensible video signal because the display device is not capable of displaying the input signal provided to it.

Some prior art solutions have attempted to solve this problem (e.g., the user selecting a unsupported display resolution) by waiting for a user to acknowledge that the resolution change worked. If no acknowledgement is received within a defined time out period the resolution is restored to the previous working resolution. Unfortunately, this time out method is not consistently reliable, because depending upon how it is implemented (e.g., set-top box, media center PC, etc.), the timeout function may freeze or stop functioning.

With respect to PC-based systems (e.g., small form factor set-top box PC systems, wired or wirelessly connected PCs, etc.), the software-based functionality (e.g. operating systems) of the systems do not provide even a time out mechanism. In this case, the user will be stuck with the unsupported resolution. For example, the user may be stuck with a blank screen because he/she cannot see an application on screen, control panel menu, or the like to fix the output settings. Being suddenly confronted with a blank screen, the user may also not realize what the mistake was and further be stuck because he/she does not know how to go about fixing the problem. In some instances, the only solution to restore the resolution is to reboot or restart the computer system.

Further, an output configuration application may be running on a computer system (e.g., connected to a home entertainment system) in user space and thus not in protected mode. This attribute tends to make the application unreliable for ensuring the user is not left with an unusable output on a display device. For example, the output configuration application waiting for an acknowledgement from a user may be running in user space and stop functioning as a result of a bug or malfunction in another user space application (e.g., $3^{rd}$ party software, spyware, viruses, etc.).

Thus, a need exists for a reliable way for users to restore the resolution so that the output is not left at a resolution unsupported by a display device. What is further needed is a way to automatically return to a displayable resolution so the user is not presented with a blank screen, and thus no on screen menu or interface that can correct the problem. The required system should be transparent and intuitively comprehended by the user.

SUMMARY OF THE INVENTION

Embodiments of the present invention provide a solution that enables a user to reliably restore the output to settings supported by a display device. Embodiments of the present invention further provide a user with a transparent and intuitively comprehended system for restoring output settings and usability of a display device.

In one embodiment, the present invention is implemented as a method for restoring an output mode of a display output for a display (e.g., LCD display, projection TV display, plasma display, and the like). The method includes receiving a signal to change a resolution of the display output. The display output is provided to the display and is configured to drive the display (e.g., standard definition video output, high definition video output, etc.). Upon receiving the signal, an interrupt is generated for a display driver executing on a computer system. The display driver is configured to control a display processor of the computer system. In response to the interrupt, graphics system processing operations are modified to restore a display capable resolution of the display output to a compatible output mode for driving the display. Additionally, a control panel application is executed on the computer system to present an on-display control for changing the output mode.

In this manner, embodiments of the present invention implement a reliable way for a user to restore a display capable resolution of the display output to a mode that will be supported by the display device. The user can be provided with an easy way to generate a signal (e.g., pushing a button on a remote, computer system, etc.) that will automatically initiate the restoration of the display to a compatible resolution, thereby, for example, greatly assisting the user in those circumstances where the user inadvertently changes the output mode of the display output to an unusable output.

In another embodiment, the present invention is implemented as a system for outputting graphics. The system includes a plurality of output connectors (e.g., DVI, VGA, Component, etc.) for coupling a plurality of display devices. The display devices are driven by a display processor for handling graphics processing and outputting a video signal on the plurality of output connectors. The display processor also includes a plurality of connectors. A second processor controls a plurality of functions of the display processor by executing a display driver and an application for changing a plurality of graphics settings of the display device. An input device is communicatively coupled to at least one of the plurality of connectors of the display processor and invokes a change in output timing so the output is viewable on at least one of the display devices coupled to the output connectors.

In another embodiment, the present invention is implemented as a graphics processing unit (GPU). The GPU includes a graphics data source for receiving graphics data from a graphics content source and a plurality of outputs operable to drive a plurality of display device(s) with processed graphics data. The system further includes a connector for receiving a signal to restore the output to a compatible output mode; and a plurality of pipelines, wherein at least one of the plurality of pipelines is configurable for facilitating output of a compatible output mode. In one embodiment, the signal to restore the output to a compatible output mode may be received via a GPIO pin. In another embodiment, the signal to restore the output to a compatible output mode may be received via an application which receives signals from an RF, IR, or the like receiver.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
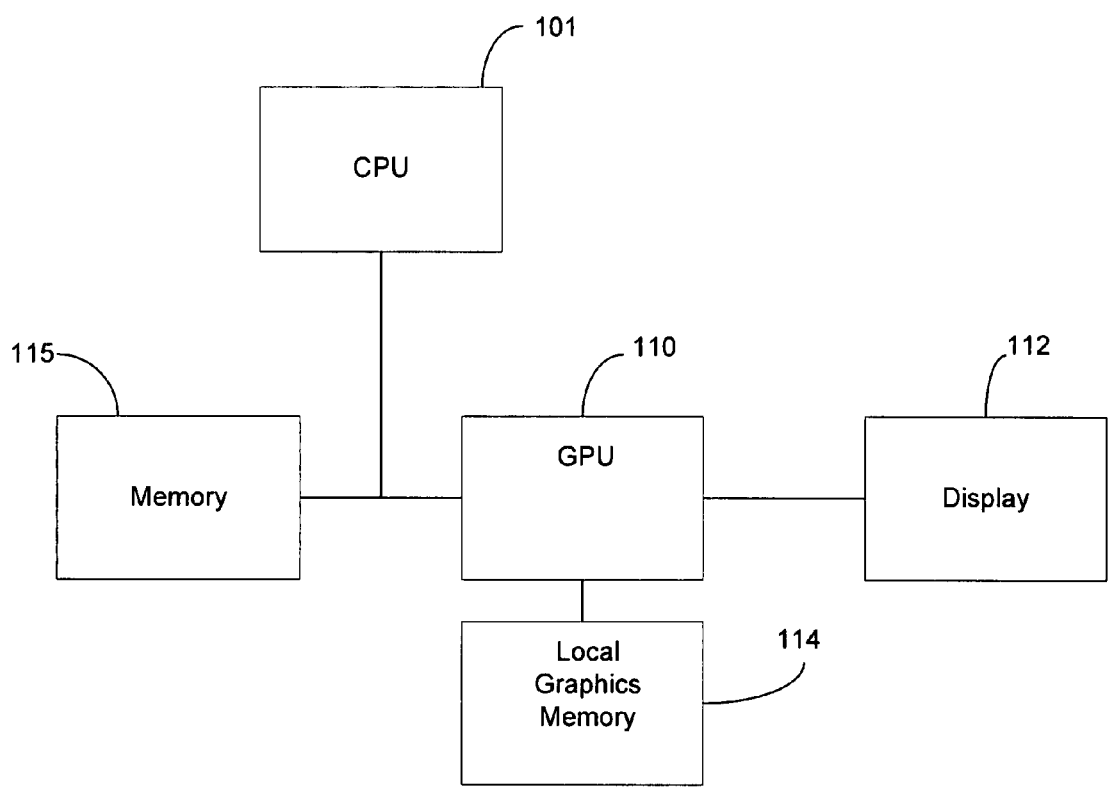
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Figure 2:
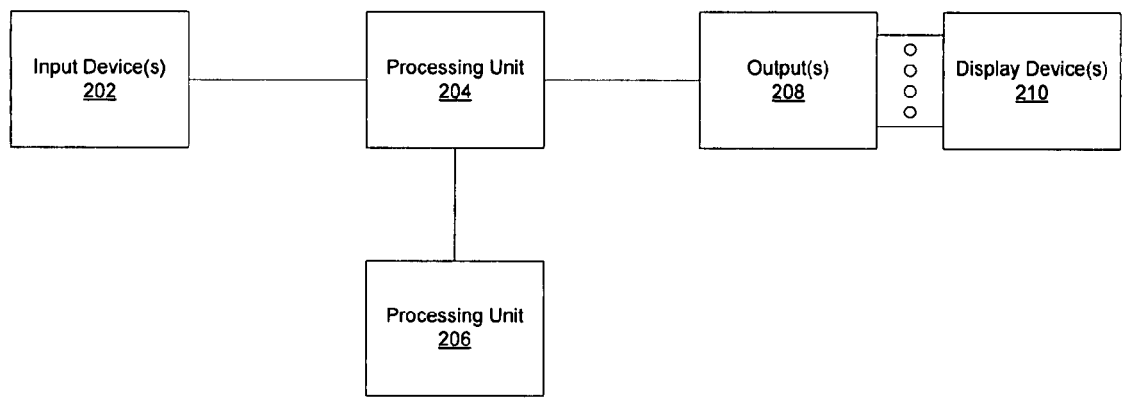
FIG. 2 shows a block diagram of an operating environment in accordance with one embodiment of the present invention.

Example Operating Environment:

FIG. 2 shows an operating environment of a system 200 in accordance with an embodiment of the present invention. System 200 includes input device(s) 202, processing unit 204, processing unit 206, output(s) 208 and display device(s) 210.

Input device(s) 202 may include devices such as a remote control, an IR receiver device, a button on a system chassis, or the like. Input device(s) 202 may be coupled to processing unit 204 via one or more of a plurality of connectors. In one embodiment, input device(s) 202 may be communicatively coupled to processing unit 204 via a general purpose input output pin or connector. General purpose input output connectors may be used for input in a master mode and output in a slave mode. In another embodiment, a simple serial port such as, I²C, can be used. In one embodiment, processing unit 204 is a graphics processing unit (GPU) and is responsible for handling graphics data and rendering graphics data for output on outputs(s) 208 to display device(s) 210. In one embodiment, input device 202 may be used to change or restore a render capable output resolution of graphics data by processing unit 204 which is displayed on display device(s) 210. For example, if the user sets a resolution that is too high or exceeds the capabilities of display device(s) 210, display device(s) 210 may show nothing or corrupted or incomprehensible images and a user may then use input device 202 to signal processing unit 204 that the resolution needs to be restored to a display capable resolution that allows the user to select a display capable resolution for display device(s) 210.

In one embodiment, a button on input device 202 will directly (e.g., button on a chassis) or indirectly (e.g., button on remote control) signal the processing unit 204 that a display capable resolution needs to be restored. In response to the signal from input device 202, processing unit 204 may signal a display driver executing on processing unit 206 which modifies the graphics processing operations of processing unit 204 and thereby changes the output timings to display device(s) 210. In one embodiment, output(s) 208 may be connected to a single display device (e.g., one of display device(s) 210) and when the output timings are changed the output connector which a signal is sent out over is changed. In one embodiment, the output may be changed to a lower resolution output and/or analog output to ensure the video signal is now visible.

Processing unit 206 may be coupled to processing unit 204. In one embodiment, processing unit 206 may execute a display driver for controlling a plurality of functions and operations of processing unit 204 and may execute an application for changing a plurality of graphics settings (e.g., a control panel application).

Figure 3:
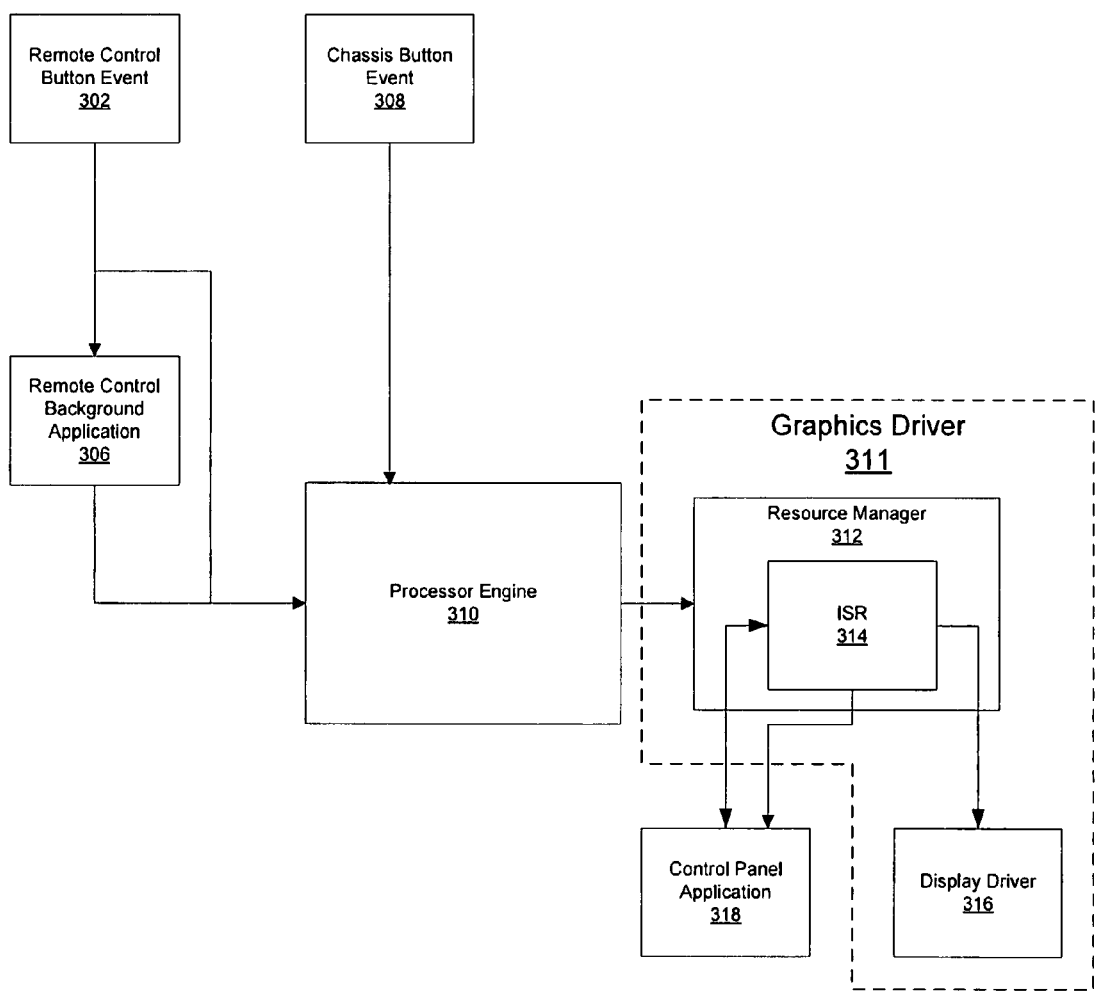
FIG. 3 shows a diagram of a system for restoring output to a display device in accordance with one embodiment of the present invention.

FIG. 3 shows a system 300 for restoring output to a display device in accordance with one embodiment of the present invention. As depicted in FIG. 3, the components 302-318 implement the functionality for restoring a supported output mode for a couple display.

The FIG. 3 embodiment illustrates example components or modules that, in various embodiments, are instantiated and executed by a CPU (e.g., CPU 101 of FIG. 1) and/or a GPU (e.g., GPU 110) under the control of computer-readable and computer-executable instructions. However, it should be appreciated that the aforementioned components of system 300 can be implemented in hardware or software or in a combination of both, and that various other components or variations of the components recited in system 300 can be used to implement the functionality of embodiment of the present invention.

In one embodiment, as depicted in FIG. 3, system 300 includes remote control event 302, remote control background application 306, chassis button event 308, a processor engine 310 (e.g., as executed by hardware/software of a GPU), control panel application 318, and graphics driver 311 which includes resource manager 312, interrupt service routine (ISR) 314, and display driver 316.

Processor engine 310 may receive signals from chassis button event 308 and remote control button event 302 to restore a rendered output to a display device. The signals regarding the remote control button event 302 are received via remote control background application 306. It is appreciated that processor engine 310 may receive signals via other buttons and interfaces with the same signal being issued to processor engine 310.

After a user has changed the output resolution, the output of a coupled display device (e.g., display 112) may be blank, corrupted, or otherwise incomprehensible video. The user may then press a remote control button to create a remote control button event 302 or press a chassis button to create a chassis button event 308 to begin the process of restoring display intelligibility (e.g., the lowest common denominator resolution). In one embodiment, the remote control button event 302 may send a signal to the remote control background application 306 or processor engine 310. For example, the user presses a remote control button which sends an IR signal to an IR receiver connected to a USB port of the computer system, a 1394 port, etc., and this signal may be relayed to the remote control background application 306 or processor engine 310. In one embodiment, remote control background application 306 may be executed by a central processing unit (CPU). The remote control background application 306 may signal processing engine 310 that a display capable resolution needs to be restored.

Processing engine 310 may then signal resource manager 312 that the output needs to be a display capable resolution. In one embodiment, processing engine 310 generates an interrupt which is handled by interrupt service request module 314 which is part of resource manager 312. Resource manager 312 may be part of a graphics driver 311 which runs in protected or kernel mode of an operating system. As part of handling the interrupt, interrupt service request module 314 may signal display driver 316 that the output needs to be a display capable resolution. In one embodiment, the output to a compatible output mode (e.g., display capable resolution) can have a changeable output connector. Display driver 316 may then modify the graphics processing of GPU 316 as described further below with reference to FIG. 4.

In one embodiment, display driver 316 also runs in protected mode, or kernel mode, of an operating system. Software functionality and/or procedures and applications executing within kernel mode are systematically protected from interference from other software processes that execute in user mode (e.g., and memory protection, etc.). Software functionality and/or procedures that run in user mode do not have the same degree of systematic protection. Accordingly, kernel mode software routines and processes are more reliable than softer routines, processes, applications, drivers and the like running in user space.

Figure 4:
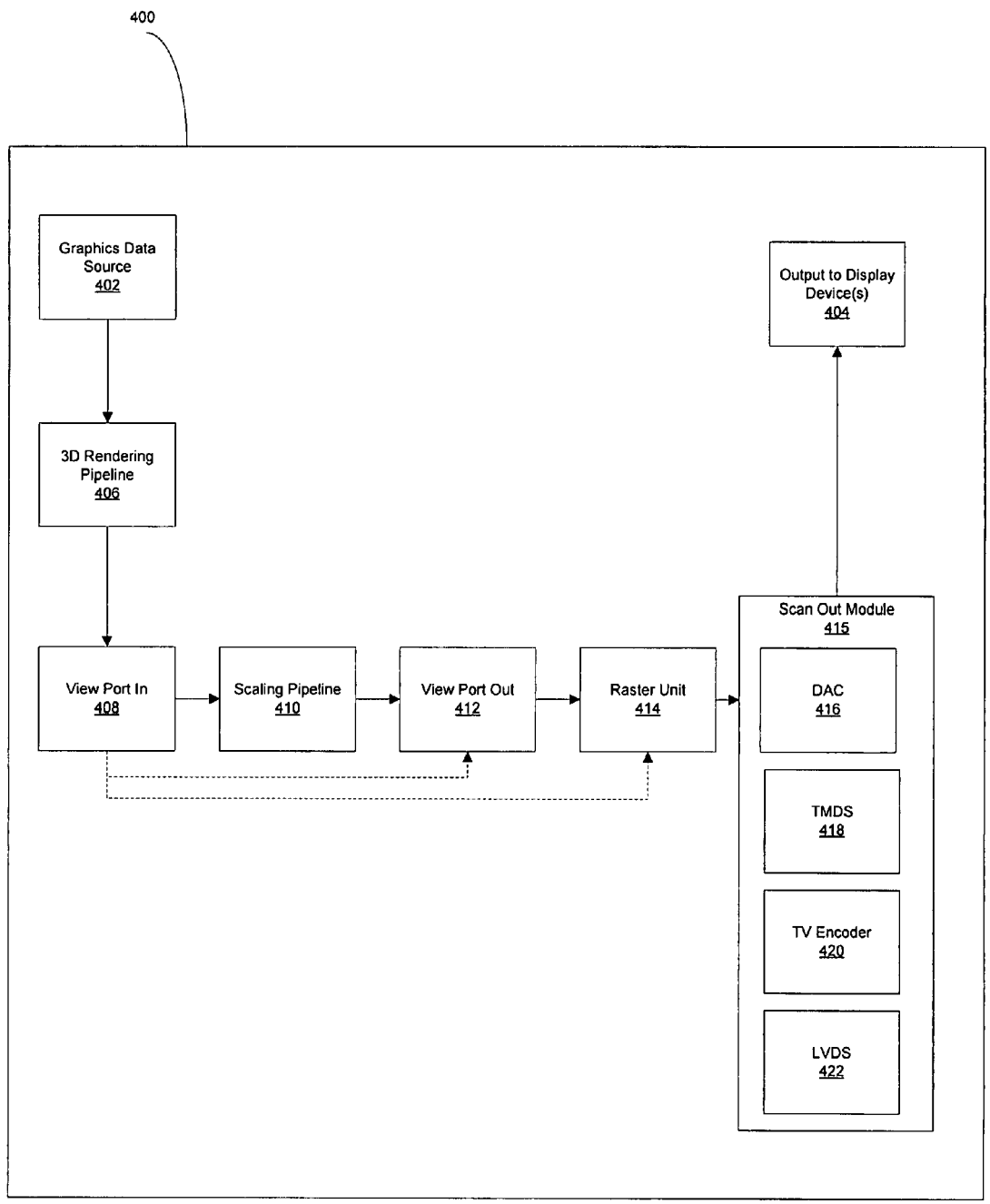
FIG. 4 shows exemplary processor pipelines in accordance with one embodiment of the present invention.

FIG. 4 shows exemplary pipelines in a processor 400 in accordance with one embodiment of the present invention. Processor 400 includes graphics data source 402, output to display device(s) 404, 3D rendering pipeline 406, view port in 408, scaling pipeline 410, view port out 412, raster unit 414 and scan out module 415. Scan out module 415 may include digital to analog converter (DAC) 416, transition minimized differential signaling (TMDS) module 418, TV encoder 420, and low-voltage differential signaling (LVDS) module 422. Graphics data source 402 may provide graphics data from a plurality of sources including, but not limited to, software applications, DVDs, HD DVDs, Blu-ray DVDs, TV tuners, digital movies (e.g., MPEG2, MPEG4), cable boxes, and satellite receivers.

In one embodiment, display driver 316 may modify graphics processing by modifying the functions of raster unit 414 such that raster unit 414 rasterizes only a portion of graphics data. Graphics data 402 may be received by raster unit 414 directly from programmable view port in 408 or after passing through programmable view port 412 as indicated by dashed lines. For example, if the graphics data 402 is 1920×1080 (1080i/p) and the display device can only support 720×480, raster unit 414 may rasterize only a 720×480 portion. The portion of rasterized graphics data may be then be sent out to a display device via scan out module 415 to output to display device(s) 404 and will be visible to a user. Output from raster unit 414 may be sent to scan out module 415 for output via DAC 416 for conversion for output on an analog connector such as VGA or composite (CVBS). Alternatively, scan out module 415 may output via TMDS module 418 via DVI, HDMI, or Display Port. Scan out module 415 may also output via TV encoder 420 which modifies the output for televisions or similar devices. Scan out module may also output via LVDS 422 to an integrated LCD.

The display driver 316 may further modify the output timing or horizontal and vertical resolution so output is visible on a display device. In one embodiment, display driver 316 may set the output timing to a standard setting known to be supported by most display devices. For example, the output timings may be set to 480i. A standard or output timing mode that is used because of support for many display devices and thus ensures that the display can comprehend or render the video which may be referred to as the lowest common denominator. The adjusting of the output timings does not interfere with other graphics processing operations. For example, the display driver does not have to change the resolution, color depth, or refresh rate and thus other operations such as 3D applications and full screen playback can continue uninterrupted.

After the output timings are changed, a user will now be able to see a portion of the graphics on the screen based on the portion of the graphics screen being rasterized. The user may then use a navigation device (e.g., remote control or mouse) to navigate around to find the control panel application window that has been invoked as described herein and adjust the resolution within the capabilities of the display device.

In another embodiment, display driver 316 may modify the operations of scaling pipeline 410. For example, if the graphics data received at viewport in 408 has a resolution of 1920×1080 (e.g., 1080i/p) and the output timing can be restored to 1280×720, the graphics data may be scaled without excessive loss of usability by the scaling pipeline 410 to allow the resolution to be visible on a display device. For example, even though a 1280×720 screen has far fewer pixels than a 1920 by 1080 screen, the difference in resolution would probably still enable the use of a readable control panel/menu by the user. For example, even though the control panel/menu might appear highly aliased, it should still be legible and usable. Thus, the resolution entering view port out 412 is different from the resolution entering view port in 408. In one embodiment, various other graphics functions (e.g., 3D rendering pipeline 406) may be stalled until a vertical sync interrupt is generated.

Display driver 316 may have a policy which handles the decision of whether to modify the operations of scaling pipeline 410, raster unit 414, or other pipelines. Scaling may be used when the difference in output timing is relatively small as in the above example. Rasterizing only a portion of graphics data may be used when the difference is large (e.g., 1080i/p to 480i/p). This aspect accounts for those cases where the restored display capable resolution has a very much smaller resolution (e.g., 640×480) then the improperly selected output mode (e.g., 1920 by 1080). In such cases, if the entire high-resolution screen is scaled down to the low resolution, the aliasing would be too severe for most instances of a on-screen menu/control panel to be legible and be used by a user. It is appreciated that the restoring of the display capable resolution or output timing may supersede load detection and Extended Display Identification Data (EDID).

Interrupt service routine (ISR) 314 may then notify or invoke control panel application 318. Control panel application 318 may be used to change various output settings and provide a prompt to a user to verify that the new output settings work and output to a display device is comprehensible. If user cannot or does not verify that the output settings work, a timeout may occur and control panel application 318 may signal ISR 314 to restore previous output settings. Control panel application 318 may be launched when the system starts up and remain in the background or otherwise be hidden and when ISR 314 signals control panel application 318, control panel application 318 may become visible. In one embodiment, control panel application 318 displays or reflects the current resolution or output timing on the graphics settings page or window. For example, if the output timings were changed to 480i, control panel application 318 may have the resolution setting corresponding to 480i selected. In another embodiment, the user may be presented with a message or wizard informing the user that the display capable resolution has been restored and he/she may now attempt to change it again.

In one embodiment, the input device used to restore output to a display capable resolution may be invoked several times and the various resolutions that may be outputted may be cycled through. For example, with each press of a button by a user, the output timing may be increased (e.g., 480i to 720p to 1080i to 1080p) and rastering and/or scaling may be restarted with corresponding settings to the new output timing.

In one embodiment, the refresh rate may also be changed when the display capable resolution is restored. The refresh rate may be selected according to the display devices connected, such as 60 hz (NTSC), 50 hz (PAL & SECAM), or 24 hz (e.g., projectors). The change in refresh rate may be based on information a user entered in an application (e.g., control panel application) for the type of display device (e.g., PAL, NTSC, ATSC).

The following discussion sets forth in detail the operations of the present technology for network communication management. With reference to FIGS. 5-8, flowcharts 500, 600, 608, and 800 each illustrate example blocks used by various embodiments of the present technology. Flowcharts 500, 600, 608, and 800 include processes that, in various embodiments, are carried out by a processor under the control of computer-readable and computer-executable instructions. Although, specific blocks are disclosed in flowcharts 500, 600, 608, and 800, such blocks are examples. That is, embodiments are well suited to performing various other blocks or variations of the blocks recited in flowcharts 500, 600, 608, and 800. It is appreciated that the blocks in flowcharts 500, 600, 608, and 800 may be performed in an order different than presented, and that not all of the blocks in flowcharts 500, 600, 608, and 800 may be performed.

Figure 5:
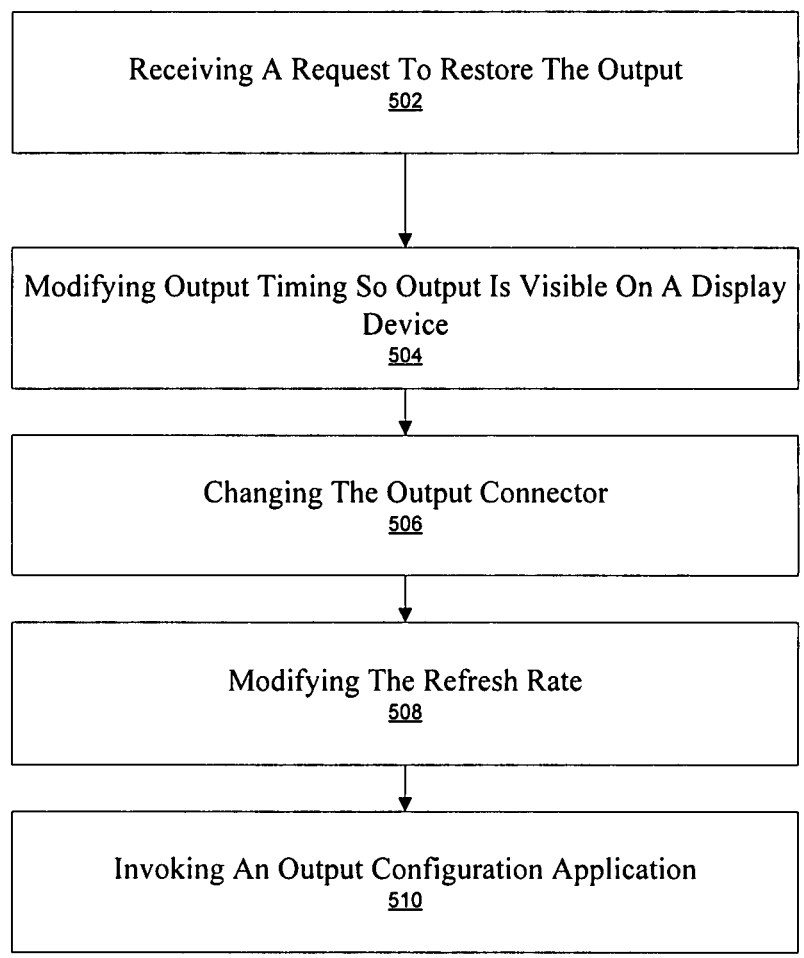
FIG. 5 shows a flowchart of a process for modifying output so the output is visible on a display device in accordance with one embodiment of the present invention.

FIG. 5 shows a flowchart 500 of a process for modifying output so that the output is visible on a display device in accordance with one embodiment of the present invention.

At block 502, a request is received to restore the output. The request may have been received via plurality of input devices as described herein such as a remote control or a button on system chassis. The request may have been issued by a user after changing the resolution settings such that the resolution settings exceeded the capabilities of the display device such that the output of the display device is blank, corrupted, or otherwise incomprehensible.

At block 504, output timing is modified so output is visible on a display device. The output timings may be changed, as described herein, such that the output of a display device is now comprehensible to a user. As described herein, the graphics processing operations may have changed (e.g., scaling or rasterizing) so the user is able to view content on the display device and change the resolution to appropriate settings for the display device.

At block 506, the connector used for outputting to a display device is changed. In one embodiment, the connector may be changed to one that is supported by more display devices. For example, the output may be changed from a DVI connector to a composite (CVBS) connector to ensure the data is visible on the display device.

At block 508, the refresh rate is modified. In one embodiment, the refresh rate may be modified along with the output timings as described herein, as to further ensure that the output on a display device is comprehensible. For example, if information (e.g., collected when output setting were configured) is available that the display device is an NTSC device, the refresh rate may be set to 60 hertz.

At block 510, an output configuration application is invoked. The output configuration application may allow a user to change output settings (e.g., resolution, refresh rate, etc.). The output configuration application may be a control panel application as described herein. The output configuration application may be running in the background (e.g., invisible) prior to being invoked and thus becomes visible (upon becoming invoked). The output configuration application may be running as the user had just used the output configuration application to set output settings which exceeded the capabilities of the display device. The output configuration application may further reflect the current output settings (e.g., output timings).

Figure 6:
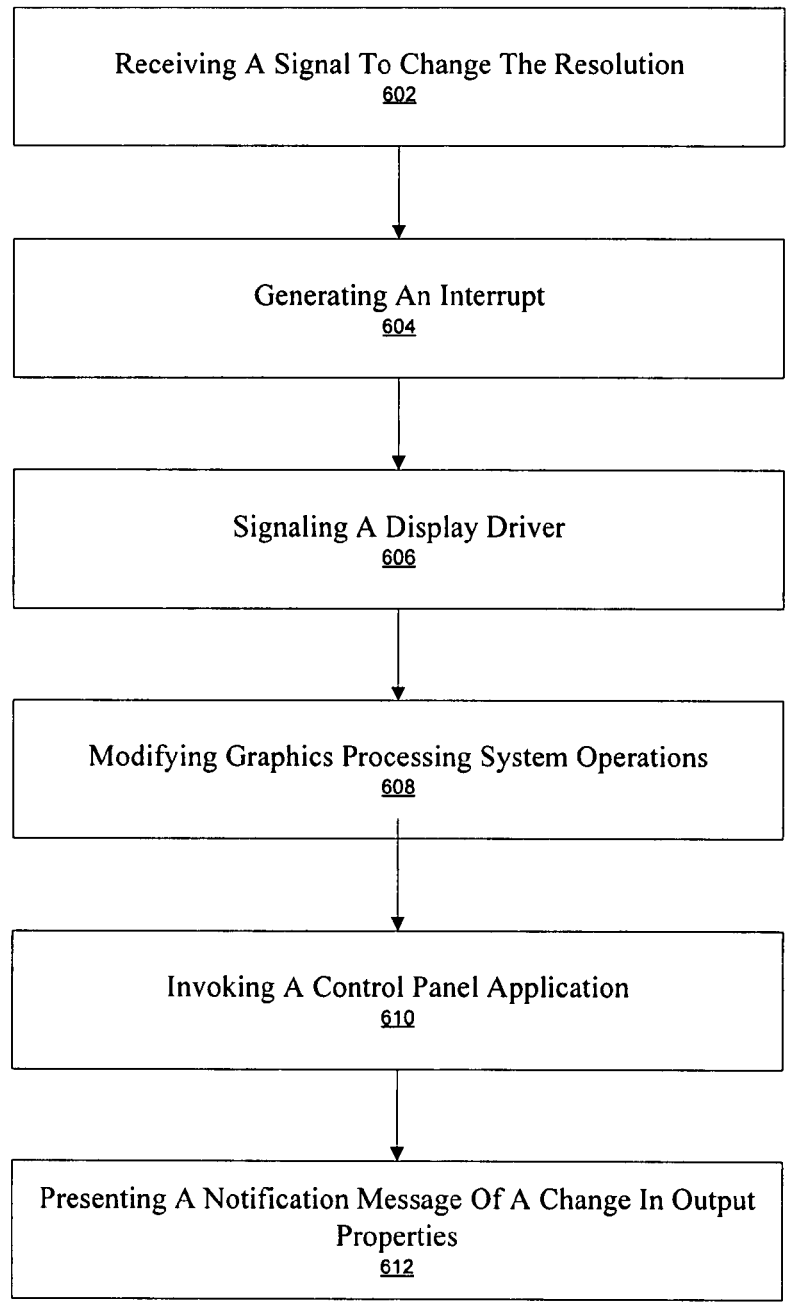
FIG. 6 shows a flowchart of a process for modifying graphics processing system operations for restoring output to a display device in accordance with one embodiment of the present invention.

FIG. 6 shows a flowchart 600 of a process for modifying graphics processing system operations for restoring intelligible output to a display device in accordance with one embodiment of the present invention.

At block 602, a signal is received to change the resolution. The request may be received via plurality of input devices as described above such as a remote control or a button on system chassis. The request may have been issued by a user after changing the resolution settings such that the resolution settings exceed the capabilities of the display device such that the display device's output is incomprehensible. In one embodiment the signal may be communicated to a processor (e.g., GPU) via a pin on the processor (e.g., general purpose input/output) as described herein.

At block 604, an interrupt is generated. In one embodiment, a processor (e.g., GPU) generates an interrupt which will be serviced by an interrupt service routine which is part of a resource manager of a graphics driver as described herein.

At block 606, a display driver is signaled. In one embodiment, the display driver is signaled by an interrupt service routine as described herein. The display driver may part of a processor (e.g., graphics processor) driver and runs in kernel or protected mode and thus is more reliable than a driver or application running in user space.

At block 608, graphics processing system operations are modified. The graphics processing system operations may be modified by a display driver as described herein with reference to FIG. 7.

Figure 7:
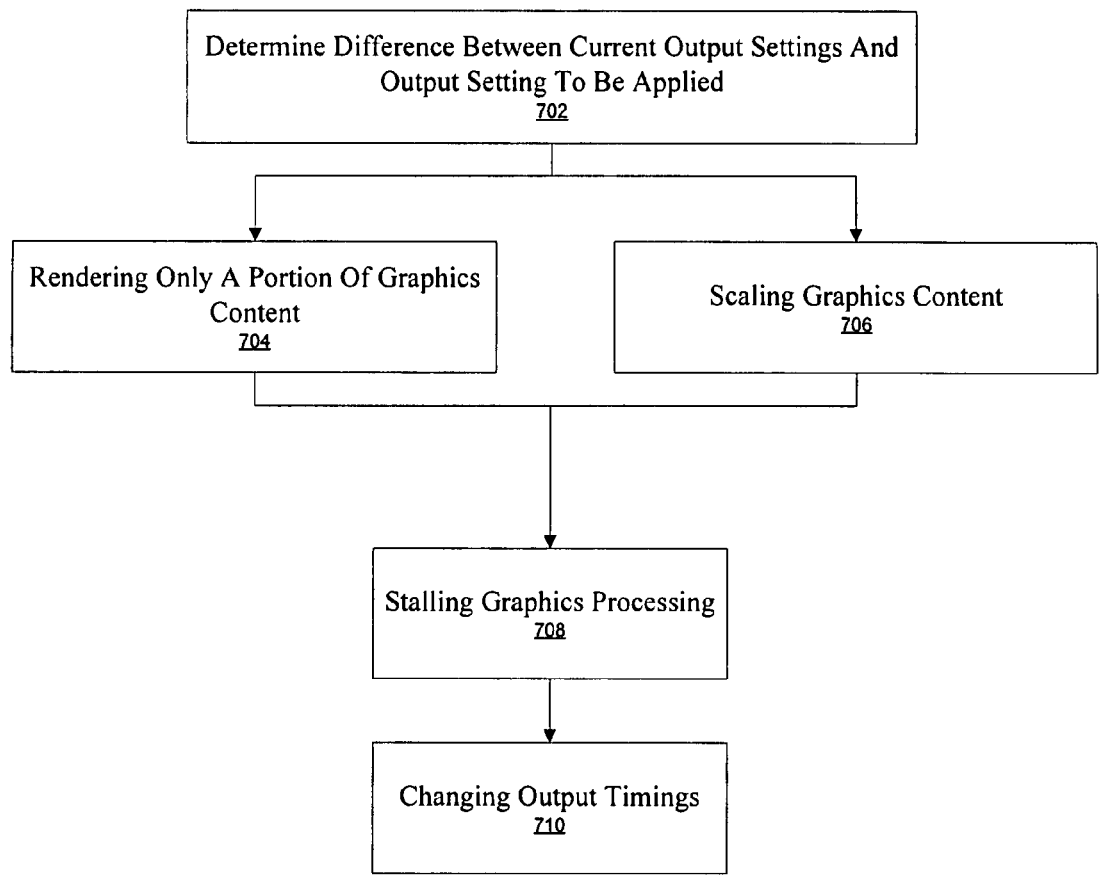
FIG. 7 shows a flowchart of a process for modifying graphics system operations in accordance with one embodiment of the present invention.

FIG. 7 shows a flowchart 608 of a process for modifying graphics processing system operations in accordance with one embodiment of the present invention.

At block 702, the difference between the current output settings and the output settings to be applied is determined. For example, if the output timings are going to be changed from corresponding to a resolution of 1920×1080 (e.g., 1080i/p) to 1280×720 (e.g. 720p) the difference may be used for determine how graphics processing operations will be modified. A policy may be applied based on the determination of the difference between the current output settings and the output settings to determine how graphics processing operations will be modified as described herein.

At block 704, only a portion of graphics content is rendered. In one embodiment, graphics processing operations are modified, as described herein, such that only a portion of graphics output is rasterized which allows a user to see a portion of the graphics output and navigate around in order to change the output settings to a more appropriate setting corresponding to the display device. In one embodiment, the rasterization of only a portion of the graphics output may be performed in response to a determination of a large change in output settings (e.g., 1080i to 480i) as described herein.

At block 706, graphics content or information is scaled. In one embodiment, graphics processing operations are modified, as described herein, graphics output is scaled (e.g. by a scaling pipeline) which reduces the output such that a user can use the graphical user interface to set output settings appropriately for the display device. The graphics processing may be scaled when the determination of the output settings to be applied and the previous settings is relatively small (e.g., 1080i to 720p). The relatively small difference may allow scaling of the graphics without excessive distortion which would otherwise prevent a user from using the output on the display device.

At block 708, graphics processing is stalled. In one embodiment, when the graphics processing system operations are modified, as described herein, operations (e.g., 3D rendering) may be stalled until a vertical sync interrupt is generated. This stalling of certain graphics processing operations allows the graphics processing operations to resume more quickly than if the pipelines were emptied or flushed after each output settings change.

At block 710, output timings are changed. The output timings may be changed, as described herein, such that the output of a display device is now comprehensible to a user. For example, the output timings may be set to 480i to ensure that the graphics output is now visible on a display device.

Referring back to FIG. 6, at block 610, a control panel application is invoked. A control panel application may allow a user change various graphics settings including the resolution as described herein. The control panel application may be running in a hidden or background mode since having been launched upon startup. The control panel application may also be running or executing as the user used the control panel application to change output settings (e.g., resolution or refresh rate) which exceeded the capabilities of the display device and caused a request to change the resolution to be made. In one embodiment, the output settings displayed by the control panel will reflect the current output settings as described herein.

At block 612, a notification message of a change in output properties is presented. A visual notification window, wizard, or other messaging means may be presented to a user via a graphical user interface indicating the output settings have been changed in response to a request to change the resolution as described herein. In one embodiment, the notification message may be a control panel application message.

Figure 8:
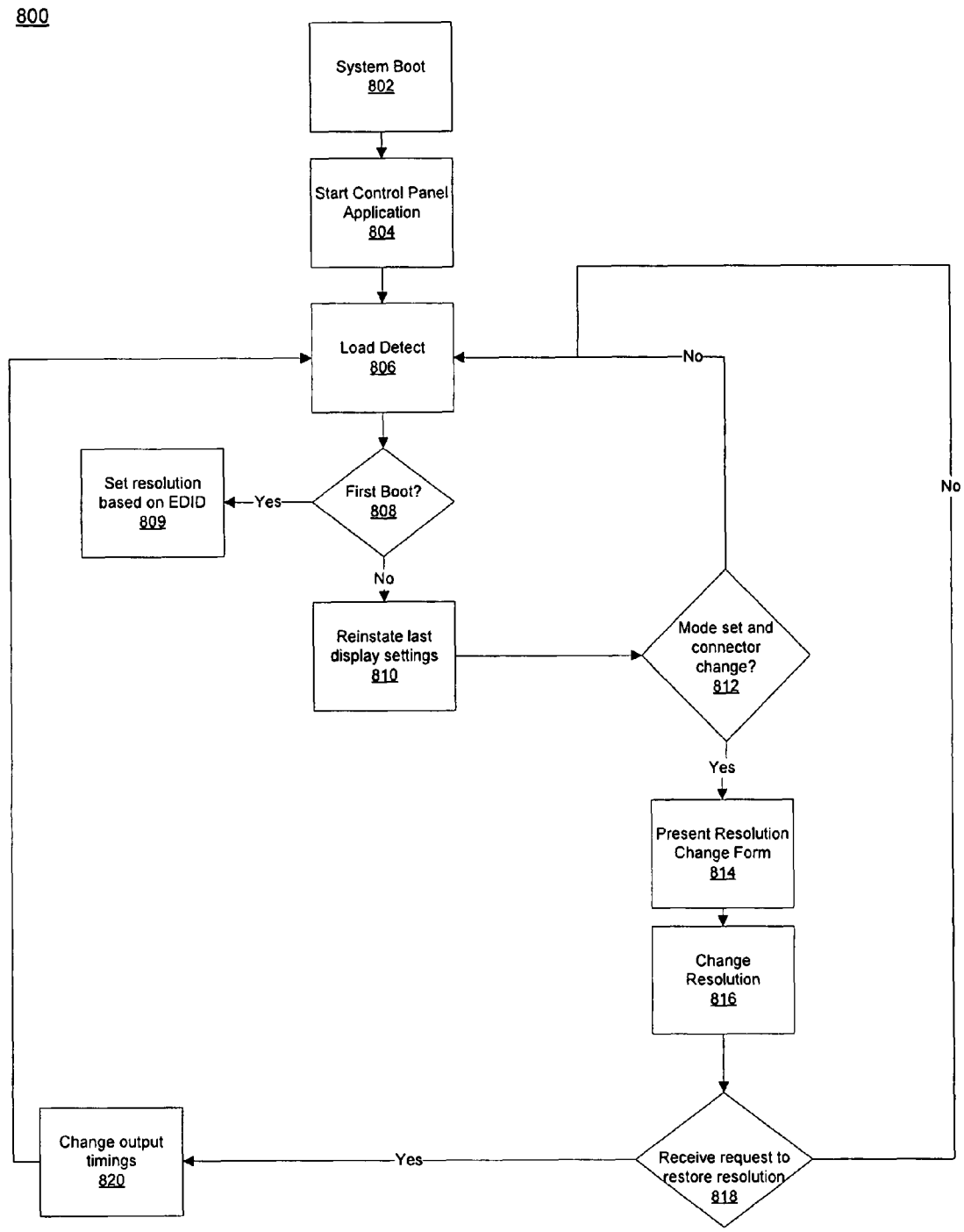
FIG. 8 shows a flowchart of a process for operating a system in accordance with one embodiment of the present invention.

FIG. 8 show a flowchart 800 of a process for operating a system in accordance with one embodiment of the present invention.

At block 802, a system is booted. The system may be computing system which has multimedia capabilities and is connected to a display device that has been restarted or booted from a turned off state.

At block 804, a control panel application is started. As described herein, the control panel application may facilitate setting of various graphics output settings. The control panel application may be started in a background or hidden mode and thus be ready to be invoked (e.g., by an interrupt service routine).

At block 806, load detection is performed. The load (e.g., electrical) may be detected on each output interface. For example, an HDMI and composite connection may be detected. During load detection, extended display identification data (EDID) may be received which describes the capabilities of a display device.

At block 808, a check if this is the first boot of the system is performed. First boot information may be stored on a storage device (e.g., hard drive) within the computing system.

At block 809, the resolution is set based on EDID. During the first boot, output settings such as resolution may be set based on the EDID which provides information on the capabilities of a display device.

At block 810, the last or previous display or output settings are reinstated. When the boot sequence is determined to be other than a first boot, previous display settings may be applied.

At block 812, a check if there is a change to the mode setting or connectors is performed. If the user changed the resolution or output connector, then block 814 is performed. If there was no change of resolution by the user, then load detection at block 806 is performed.

At block 814, a resolution change form is presented. The resolution change form may be part of a output configuration or control panel application as described herein.

At block 816, the resolution is changed. A resolution change is applied after being selected by a user within an output configuration tool which may exceed the capabilities of the display device.

At block 818, a check is made if a request to restore output is made. The request may have been made via a remote control button or chassis button as described herein by a user in response to a resolution change which resulted in output of a display device being incomprehensible.

At block 820, the output timing is changed. The output timing may be made after graphics processing operations have been modified as described herein, so that output of a display device is restored to a state where a user can utilize a control panel application to set the resolution and other graphics settings more appropriately tailored to the capabilities of the display device.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for restoring an output mode of a display output for a display, comprising:
   receiving a signal to change a resolution of the display output that drives the display;
   generating an interrupt for a graphics driver executing on a computer system, the graphics driver configured to control a display processor of the computer system, and wherein said interrupt is sent to said graphics driver responsive to said display failing to display graphics output generated by said display processor as a result of an output mode of said display output being incompatible with said display;
   responsive to said interrupt, modifying graphics system processing operations to restore a display capable mode of the display output to a compatible output mode for driving the display; and
   responsive to said interrupt executing instructions of a control panel application to present an on screen control user interface on said display, wherein said on-screen control user interface is configured to receive user inputs for changing the output mode of said display output.

2. The method of claim 1 further comprising:
   presenting a notification message of a change in output properties.

3. The method of claim 1 wherein said notification message is a control panel message.

4. The method of claim 1 wherein said control panel application displays the current resolution setting.

5. The method of claim 1 further comprising:
scaling graphics content to allowing viewing on a display device.

6. The method of claim 1 further comprising:
rendering only a portion of a plurality of graphics data.

7. The method of claim 1 further comprising:
stalling graphics processing operations.

8. The method of claim 1 further comprising:
determining a difference between the current output settings and the output settings to be applied.

9. A system for outputting graphics, comprising:
a plurality of output connectors operable for coupling a plurality of display devices;
a first processor coupled to said plurality of output connectors and operable to handle graphics processing and provide graphics output to said display devices via said plurality of output connectors;
a second processor for executing a graphics driver for controlling a plurality of functions of said first processor and instructions of a control panel application to present an on-screen control user interface on a display device responsive to an interrupt received by said graphics driver for changing a plurality of graphics settings based on user inputs for changing in the output settings of said output connectors, and wherein said first processor is operable for generating an interrupt for said graphics driver, and wherein said interrupt is sent to said graphics driver responsive to said at least one of said display devices failing to display graphics output generated by said graphics driver as a result of an output mode being incompatible with at least one of said display devices; and
an input device communicatively coupled to at least one of said plurality of output connectors for invoking a change in output timing so said graphics output is viewable on at least one of said plurality of display devices coupled to at least one of said plurality of output connectors.

10. The system of claim 9 wherein said first processor is a GPU (graphics processing unit).

11. The system of claim 9 wherein said input device is a remote control, wherein said remote control is operable to invoke said change in output timings.

12. The system of claim 9 wherein said input device is a button coupled to a system chassis, wherein said button is operable to invoke said change in output timings.

13. The system of claim 9 wherein said first processor comprises a plurality of pipelines for processing graphics.

14. The system of claim 13 wherein said first processor comprises a scaling pipeline.

15. The system of claim 14 wherein said first processor comprises a raster unit.

16. The system of claim 9 wherein said input device changes the output timings on each successive request.

17. A GPU (graphics processor unit) comprising:
a graphics data source for receiving graphics data from a graphics content source;
a plurality of outputs operable to drive a plurality of display devices;
a connector for receiving a signal to restore the output to a compatible output mode;
an interrupt generator operable to generate an interrupt for a graphics driver, wherein said interrupt is sent to said graphics driver responsive to said signal to restore the output to a compatible output mode when at least one of said plurality of display devices fails to display output generated by at least one of said plurality of outputs as a result of an output mode being incompatible with at least one of said display devices; and
a plurality of pipelines, wherein at least one of said plurality of pipelines is configurable for facilitating output of a compatible output mode.

18. The GPU of claim 17 wherein output to a compatible output mode can have a changeable output connector.

19. The GPU of claim 17 wherein said plurality of pipelines comprises a scaling pipeline.

20. The GPU of claim 17 wherein said plurality of pipelines comprises a raster unit for rasterizing graphics data.

21. The GPU of claim 17 wherein said plurality of pipelines comprises a 3D rendering pipeline.

22. The GPU of claim 17 wherein said connector is a GPIO (General Purpose Input Output) connector.

23. The method of claim 1 wherein said modifying graphics processing operations is performed in response to said interrupt for said graphics driver.

24. The method of claim 1 wherein said display capable resolution is a first resolution lower than a second resolution, wherein said second resolution was previously output.

\* \* \* \* \*